Dec. 10, 1963 R. R. BLAIR 3,114,049

TRANSISTOR TRIGGER CIRCUIT

Filed Nov. 9, 1956

INVENTOR
R. R. BLAIR
BY [signature]
ATTORNEY

3,114,049
TRANSISTOR TRIGGER CIRCUIT

Royer R. Blair, Berkeley Heights, N.J., assignor to Bell Telephone Laboratories, Incorporated, New York N.Y., a corporation of New York Filed Nov. 9, 1956, Ser. No. 621,254
26 Claims. (Cl. 307—88.5)

Figure 1:
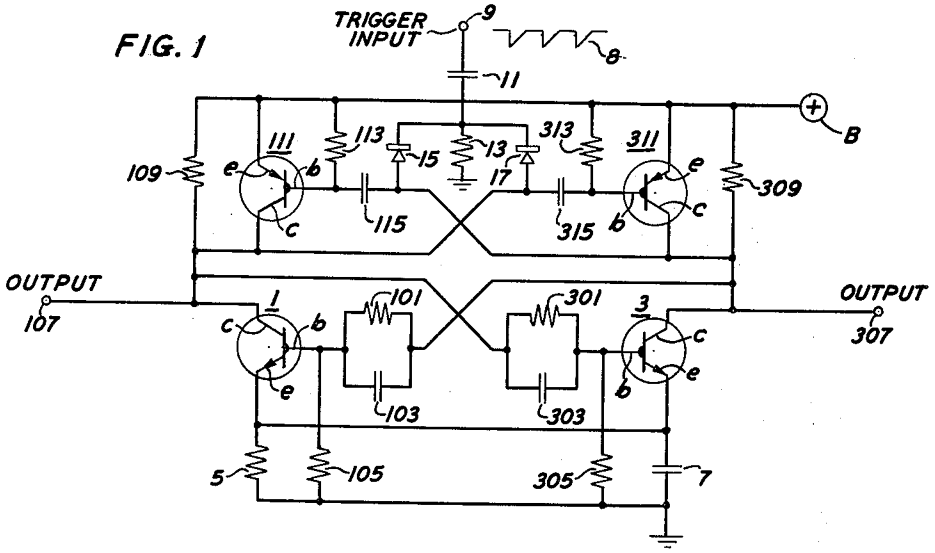

This invention pertains to multistate circuits, and more particularly to multistate circuits utilizing transistors as the active elements.

Multistate circuits of the type which respond to successive pulses by assuming different operating states are widely used in timing, counting, and computing devices. In most cases the number of possible states is two, the circuit then being known as a "trigger circuit." Most trigger circuits comprise a pair of similar active elements so interconnected that when one element is in a first stable state the other element is in a second stable state, and vice versa. Neither element is stable when its operating conditions lie in the range intermediate between those existing in the stable states. If an applied pulse changes the operating conditions of either element from those which exist in one of the stable states to those in the intermediate range, the resultant instability favors a continued change of the operating conditions of both elements toward those which exist in their opposite stable states. This reversal of states constitutes a rapid switching operation, and occurs in a time determined by the construction of the circuit and the characteristics of the active elements. That is, the switching time is substantially independent of the characteristics of the applied trigger pulse. The state of the circuit at any time is usually referred to in terms of the state of a designated one of the active elements, so that the circuit is considered to be in the first or second stable state depending upon whether the designated element is in its first or second stable state.

A trigger circuit may be designed so that an applied trigger pulse only temporarily reverses its state, the circuit automatically reverting to its original state after a predetermined interval. Trigger circuits of this type are said to be "monostable." Alternatively, the circuit may be designed to remain quiescent until another trigger pulse is applied to return it to the original state. Such trigger circuits are said to be "bistable," and are an essential component of virtually all digital counters and computers. A general exposition on this classification of trigger circuits is given on pages 440 through 445 of "Transistor Electronics" by A. W. Lo et al., Prentice-Hall, Inc., 1955. An analysis of bistable trigger circuits and their use as computing devices is given in Chapter 8 of the text "Recurrent Electrical Transients" by L. W. Von Tersch and A. W. Swago, Prentice-Hall, Inc., 1953. Chapter 9 of the latter text includes an analysis of monostable trigger circuits, which are often referred to as "one-shot multivibrators."

Trigger circuits employing vacuum tubes as the active elements have been developed to a relatively high degree of operating effectiveness. However, the attractively low power requirements, compactness, and long life of transistors have stimulated effort toward devising transistor trigger circuits having the high degree of reliability and switching speed required by modern computing equipment. Some of the problems which must be solved in order to realize this objective have their counterparts in vacuum tube trigger circuits, as, for example, the retarding effect of capacitances on the rate of rise of the output voltage when a transistor is pulsed from the conducting or "on" state to the nonconducting or "off" state. The copending joint application of H. F. Priebe, Jr., and A. E. Spencer, Jr., Serial No. 459,904, filed October 14, 1954, now Patent No. 2,787,712, and assigned to applicant's assignee, attacks this problem by providing means for isolating the transistor which is being turned "off" from the other trigger circuit elements. The instant invention circumvents the capacitive retarding effect by supplying a large amplitude charging current of short duration to increase the rate of charging of the capacitances involved.

A problem peculiar to transistor operation which adversely affects the rate of rise of the output voltage of a transistor which is switched from the "on" to the "off" state is the delay between the time a trigger pulse is applied and the time the transistor actually does turn "off" in response thereto. As described on pages 1768 through 1771 of the article "Large Signal Behavior of Junction Transistors" by J. J. Ebers and J. L. Moll, appearing in the December 1954 issue of the Proceedings of the Institute of Radio Engineers, volume 42, this delay is greatest when the current conducted by the transistor in the "on" state is sufficiently large to "saturate" the transistor. Since the one of the transistors in a trigger circuit which is "on" is generally driven to saturation in order to assure a high degree of circuit stability, a material delay in switching it to the "off" state has been characteristic of most transistor trigger circuits. The copending joint application of the applicant and J. R. Harris, Serial No. 587,888, filed May 28, 1956, now Patent No. 2,887,542, and assigned to applicant's assignee, overcomes this problem by providing means for preventing the various steady state transistor voltages from assuming values which produce saturation. In accordance with the present invention the "on" transistor is driven to saturation, but the turn-off time is greatly reduced by supplying increased current to the collector of the "on" transistor when it is triggered "off." This current persists only during the interval the trigger circuit is being switched, thereby avoiding the danger of saturating transistors in external circuits driven by the trigger circuit.

A principal object of the invention is to provide an improved transistor trigger circuit.

A further object is to provide means for increasing the rate at which the output voltage of a transistor which is switched from one to another of its stable operating states reaches its steady value, without affecting operating conditions in the stable states.

A further object is to provide means for increasing the speed at which a transistor trigger circuit switches from one to the other of its operating states in response to a trigger pulse, without adversely affecting the operating conditions which exist while the circuit is in either operating state.

In accordance with the invention, the power supply resistor of the output electrode of the "on" transistor in a conventional two-transistor trigger circuit is shunted by normally open switching means which is caused to close momentarily by the same trigger pulse which causes that transistor to turn "off." A burst of current of large amplitude is thereby delivered to the output electrode of the transistor being turned "off," and rapidly charges all capacitances affecting the rate of rise of its potential. This current is also of the correct polarity to assist in the process of causing the "on" transistor to turn "off" and the "off" transistor to turn "on." The result is a sharp rise in the output voltage of the formerly "on" transistor to its steady state "off' value. After effecting this result the switching means reverts to its quiescent state, and has no further effect on the trigger circuit until application of a new trigger pulse. In this way, the danger of saturating any transistors in external circuits which may be connected to the trigger circuit is avoided.

Figure 2:
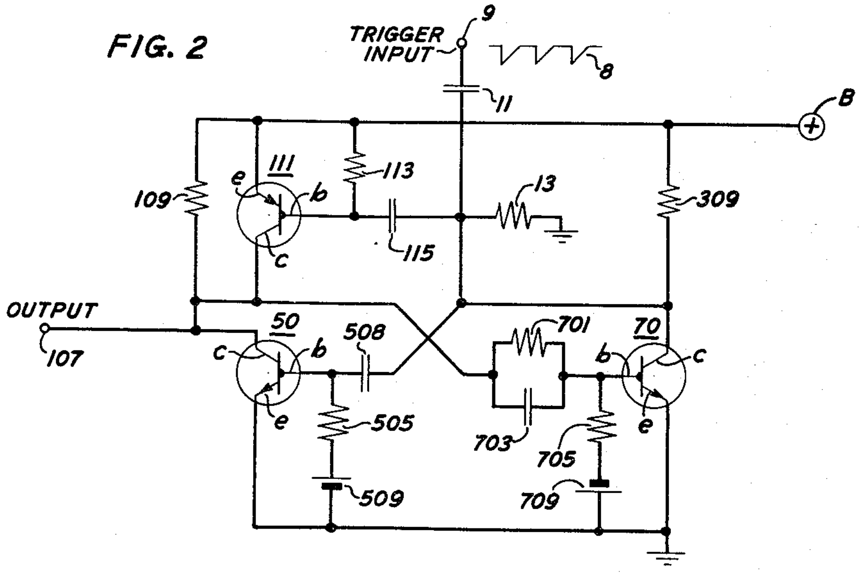

Other features of the invention are described in detail in the following specification with reference to the accompanying drawings, in which:

FIG. 1 is a circuit diagram of a bistable transistor trigger circuit embodying the invention; and FIG. 2 is a circuit diagram of a monostable transistor trigger circuit, or "one-shot multivibrator," also embodying the invention.

In FIG. 1 the trigger circuit comprises a pair of transistors 1 and 3 of the same type. In accordance with convention, the outward direction of the arrows on emitters 1*e* and 3*e* indicate that forward current flow is outward from the emitters and that these transistors are of the n-p-n type. The circuit will be described on this basis, but it should be understood that transistors of the p-n-p type could be substituted so long as all voltage and current polarities in the circuit are reversed. A pair of point contact transistors also could be substituted, with minor circuit changes, but since junction transistors operate at lower voltages and provide a greater difference in collector-to-emitter impedance when switched between the "on" and "off" states the junction type is preferable. Emitters 1*e* and 3*e* are connected to ground by a self-bias circuit comprising a resistor 5 and capacitor 7 in parallel. Collector 1*c* of transistor 1 is coupled to base 3*b* of transistor 3 by a resistor 301 and capacitor 303 in parallel. Similarly, collector 3*c* of transistor 3 is coupled to base 1*b* of transistor 1 by a resistor 101 and capacitor 103 in parallel. Bases 1*b* and 3*b* are respectively connected to ground by resistors 105 and 305. Negative trigger pulses 8 may be applied to the circuit at terminal 9, and will pass through blocking capacitor 11 and appear across grounded resistor 13. The junction of capacitor 11 and resistor 13 is connected by a diode 15 to collector 3*c* of transistor 3 and by another diode 17 to collector 1*c* of transistor 1. These diodes and resistors 13 form a well-known pulse steering circuit whereby a negative pulse at terminal 9 is conducted to whichever of collectors 1*c* and 3*c* is at the higher potential. The trigger circuit provides output pulses at collectors 1*c* and 3*c*, which have been connected to output terminals 107 and 307, respectively. Collectors 1*c* and 3*c* are connected to positive direct voltage source B via supply resistors 109 and 309, respectively.

Assume that transistor 1 has just been turned fully "on," so that current is flowing in the path from source B through resistor 109, collector 1*c*, emitter 1*e*, and resistor 5 to ground. The collector-to-emitter impedance of a fully "on" transistor is small, so that the potentials to ground of collector 1*c* and emitter 1*e* are each substantially equal to a fraction of the voltage of source B established by the voltage division between resistors 5 and 109. Typically, this potential may be about one-third of the voltage of source B. Source B also produces current in the series path comprising resistors 309 and 101, base 1*b*, emitter 1*e*, and resistor 5 to ground. This current is in the proper direction so that transistor 1 continues to be "on." The base-to-emitter impedance is small for such forward current flow, so that base 1*b* is at a potential almost the same as that of emitter 1*e*.

In transistor 3, the potential of collector 3*c* is a substantial fraction of the voltage of source B established by the voltage division between supply resistor 309 and the series combination of resistor 101 and the base-to-emitter impedance of transistor 1. This potential may typically be about two-thirds the voltage of source B, the resistance of resistor 101 being more than twice that of resistor 309, and the base-to-emitter impedance of an "on" transistor being negligible in comparison to those resistances. The potential of base 3*b* is a fraction of the potential of collector 1*c* determined by the voltage division between resistors 301 and 305. The latter factor may, typically, be about two-thirds. Since, as explained, the potential of collector 1*c* virtually equals that of emitter 1*e*, base 3*b* will be at a lower potential than emitter 1*e*. On the other hand, since emitter 3*e* is connected to emitter 1*e*, it is at the same potential as the latter. As a result, emitter 3*e* is more positive than base 3*b* and transistor 3 remains in the "off" state.

With the trigger circuit in this steady state operating condition, capacitor 103 will be charged so that its right-hand electrode is at the relatively high potential of collector 3*c* and its left-hand electrode is at the potential of base 1*b*. The latter potential is typically only about one-third of the voltage of source B, being almost the same as the potential of emitter 1*e* as stated above. On the other hand, capacitor 303 is only slightly charged. The potential at its left-hand electrode is that of collector 1*c*, while the potential at its right-hand electrode is that of base 3*b*. With the typical relative resistance values stated, the potential of the left-hand electrode will be about one-third the voltage of source B; while that of the right-hand electrode will be about two-thirds of one-third, or two-ninths of the voltage of source B. The net charge on capacitor 303 is therefore only about one-ninth of the voltage of source B. Another feature of the steady state operating condition described is that, since the potential of collector 3*c* is greater than that of collector 1*c*, diode 15 is biased in the conducting direction. On the other hand, diode 17 is biased in the nonconducting direction by the current flowing through diode 15 and resistor 13 to ground.

Now suppose that a negative or turn-off trigger pulse is applied to terminal 9. Since diode 15 is conductive and diode 17 is nonconductive the pulse passes through the former to collector 3*c* and drops the potential at that electrode. Since the charge on capacitor 103 cannot change instantaneously, the potential of base 1*b* also drops. This reduces the current flowing from base 1*b* to emitter 1*e*, and by transistor action increases the impedance of the current path between collector 1*c* and emitter 1*e*. The potential at collector 1*c* rises sharply, and constitutes a positive or turn-on trigger pulse which is coupled through capacitor 303 to the base of transistor 3. The potential at base 3*b* thereby becomes positive relative to that at emitter 3*e*, current begins to flow between base and emitter, and by transistor action the impedance of the path between collector 3*c* and emitter 3*e* is reduced. This causes the potential at collector 3*c* to drop still more and, since that was the initial event which caused this result a regenerative switching process occurs which ends with transistor 3 being "on" and transistor 1 "off."

Attainment of steady operating conditions after the circuit switches in response to an applied trigger pulse requires that capacitor 303 be charged and capacitor 103 be discharged. The function of these capacitors is to insure that each trigger pulse switches the trigger circuit only once. When a negative trigger pulse is applied to terminal 9 it initiates switching of the circuit as described. However, capacitor 303 couples collector 1*c* to base 3*b*, and since transistor 3 is now "on" the potential of base 3*b* is virtually equal to that of emitter 3*e* and so that of emitter 1*e*. The result is that the potential of collector 1*c* cannot rise much above that of emitter 1*e* to its steady state value until capacitor 303 has charged. This limits the rate of rise of the potential of collector 1*c*, but, in addition, assures that if the trigger pulse should be of long duration it will continue to appear at collector 3*c* rather than collector 1*c* because diode 15 will still be conductive and diode 17 nonconductive. No further switching of the trigger circuit can, therefore, occur until the one of cross-coupling capacitors 103 and 303 connected to the collector of the transistor just turned "off" has fully charged.

It should be noted that any stray capcitance to ground of the collector of the transistor being turned "off" and of any external load connected to that electrode will limit the rate of rise of the collector potential in the same manner as the cross-coupling capacitor in the trigger circuit itself. In addition to these capacitive loading effects, the rate of rise of collector potential is limited by the inherent delay in the response of a transistor to a pulse tending to turn it "off." This was mentioned above with reference to the article by Messrs. J. J. Ebers and J. L. Moll. That article, together with a companion article by Mr. Moll in the same publication on pages 1773 through 1784, indicate that the turn-off delay can be reduced by increasing the current supplied to the collector. In addition, the speed of response of an "off" transistor to a pulse tending to trun it "on" can be increased by increasing the magnitude of the turn-on pulse at the base. The instant invention takes the fullest advantage of the foregoing characteristics in achieving an increase in the speed at which a transistor trigger circuit switches between its operating states.

In the circuit of FIG. 1 the emitters of a pair of switching transistors 111 and 311 are connected to source B and the collectors are respectively connected to the collectors of transistors 1 and 3. Consequently, the emitter-to-collector path of transistor 111 shunts collector supply resistor 109 of transistor 1, and the emitter-to-collector path of transistor 311 shunts collector supply resistor 309 of transistor 3. Transistors 111 and 311 are each opposite in type from transistors 1 and 3. Since transistors 1 and 3 are of the n-p-n type in the arrangement illustrated, transistors 111 and 311 are each of the p-n-p type. The bases of the latter transistors are respectively connected to source B through resistors 113 and 313, and, consequently, are each biased to be normally "off." The base of transistor 111 is also connected to the junction of diode 15 and collector 3c of transistor 3 by a capacitor 115, and the base of transistor 311 is connected to the junction of diode 17 and collector 1c transistor 1 by a capacitor 315.

Assume that transistor 1 is "on" and transistor 3 is "off," and that a negative trigger pulse is applied to terminal 9. As previously described, the rigger pulse will pass through diode 15 to collector 3c and will reverse the states of transistors 1 and 3. However, the same pulse is now also coupled through capacitor 115 to the base of switching transistor 111 and turns it "on." This reduces its emitter-to-collector impedance to a very low value, so that the full voltage of source B is applied to collector 1c of transistor 1. That is, while transistor 111 is "on," collector supply resistor 109 is effectively short-circuited. Source B thereby sends a very large burst of current to collector 1c of transistor 1 which quickly charges all capacitances connected thereto to their steady state voltages. In addition, this current greatly reduces the turn-off time required by transistor 1, and also assists in more quickly turning transistor 3 "on."

If the power supply resistor of the newly "off" transistor 1 continued to be short-circuited as described after the state of the trigger circuit had reversed in response to a trigger pulse, the large voltage at collector 1c would cause saturation of transistors in external circuits connected thereto. This is prevented in the circuit herein by virtue of the fact that transistor 111 is forced to return to the "off" state shortly after having been turned "on." The voltage of collector 1c then reaches the same steady-state value as would be obtained in the absence of transistor 111. One way in which transistor 111 may be returned to the "off" state is by termination of the trigger pulse at terminal 9, since the base bias of transistor 111 will return it to the "off" state. However, even if the trigger pulse is of long duration capacitor 115 will be quickly charged by source B over a path through the emitter-to-base impedance of transistor 111, capacitor 115, diode 15, capacitor 11 and the trigger pulse source to ground. This charge will raise the potential at the left-hand electrode of capacitor 115 relative to ground, and so also will raise the potential of the base of transistor 111. That transistor is thereby turned "off," and capacitor 115 eventnally discharges through the loop comprising resistors 113 and 309.

While the invention has been described in detail with reference to its embodiment in a bistable trigger circuit, it is apparent that it is equally adapted to trigger circuits of the monostable type. A typical monostable transistor trigger circuit, or "one-shot multivibrator," is shown in FIG. 2. The active elements are a pair of transistors 50 and 70 which may be the same as transistors 1 and 3 in FIG. 1, but are here interconnected so that in the absence of an applied trigger pulse transistor 50 remains "on" and transistor 70 "off." Collector 50c is connected to base 70b through the parallel combination of a resistor 701 and a capacitor 703 as in FIG. 1, but here base 70b is connected to ground by a resistor 705 in series with a source of negative direct bias voltage 709. Collector 70c is connected to base 50b by a capacitor 508, base 50b being connected to ground by a resistor 505 in series with a source of positive direct bias voltage source 509. Collectors 50c and 70c are, as in FIG. 1, connected to positive direct voltage source B through resistors 109 and 309, respectively. Emitters 50e and 70e are directly connected to ground, no self-bias circuit being included. Negative trigger pulses may be applied to terminal 9, which is connected by blocking capacitor 11 to collector 70c.

When the circuit is quiescent, transistor 50 being "on" and transistor 70 being "off," capacitor 508 charges to the voltage of source B over a path from source B including resistor 309, capacitor 508 and the base-to-emitter path of transistor 50. When a negative pulse is applied to terminal 9 is causes transistor 50 to turn "off" and transistor 70 to turn "on." Capacitor 508 then discharges through the collector-to-emitter path of transistor 70, source 509 and resistor 505. This current in resistor 505 holds the voltage of base 50b negative, so transistor 50 remains "off" and its high collector voltage keeps transistor 70 "on." However, after a time governed by the rate at which capacitor 508 discharges, which primarily depends on the time constant of that capacitor and resistor 505 in series, the voltage of base 50b again becomes positive and transistor 50 returns to the "on" state. The drop in voltage of collector 50c then triggers transistor 70 "off" again.

A transistor 111, which may be the same as that in FIG. 1, is connected with its collector-to-emitter path shunting collector supply resistor 109. The base of transistor 111 is connected to source B by a resistor 113 to bias it normally in the "off" state. Also as in FIG. 1, capacitor 115 connects the base of that transistor to collector 70c of transistor 70 to receive each trigger pulse applied thereto. Each time a trigger pulse occurs it causes transistor 111 to turn "on" as well as cause transistor 50 to turn "off," so that a burst of current is supplied to collector 50c in the same way as to collector 1c in the trigger circuit of FIG. 1. A much sharper rate of voltage rise at collector 50c is thereby obtained, and may be applied to external circuits at output terminal 107.

From the foregoing description it will be apparent that the invention is also adapted to use with a transistor in any applications where the transistor must be rapidly switched from one state to another to produce a substantially square output voltage step.

What is claimed is:

1. A trigger circuit comprising a transistor having a plurality of electrodes, impedance means connected to one of said electrodes for conveying operating potential thereto, means for applying a trigger pulse to at least one of said electrodes to cause said transistor to switch between alternate operating states, normally open switching means connected across said impedance means, means for applying said trigger pulse to said switching means to cause it to close in response thereto and thereby effectively short-circuit said impedance means, and means connected to said switching means for causing it to reopen a predetermined interval after such closure.

2. In a circuit comprising a transistor which is adapted to be switched from the "on" to the "off" state in response to a trigger pulse applied thereto, impedance means connected to said transistor for conveying operating potential thereto, normally open switching means connected across said impedance means, means for applying said trigger pulse to said switching means to cause it to close in response thereto and thereby effectively short-circuit said impedance means, and means connected to said switching means for causing it to reopen a short interval after such closure.

3. A trigger circuit comprising a transistor having an output electrode and an input electrode to which a trigger pulse may be applied to cause said transistor to switch from the "on" to the "off" state, a power supply source, impedance means for connecting said source to said output electrode for conveying current thereto, normally open switching means connected across said impedance means, means for applying said trigger pulse to said switching means to cause it to close and effectively short-circuit said impedance means, and means connected to said switching means for causing it to reopen a predetermined intreval after such closure.

4. In a circuit comprising an output transistor adapted to be switched from the "on" to the "off" state in response to a trigger pulse applied thereto, impedance means connected to siad output transistor for conveying operating potential thereto, a normally "off" switching transistor connected with its emitter-to-collector path shunting said impedance means, means for applying said trigger pulse to said switching transistor to turn it "on," and means connected to said switching transistor for returning it to the "off" state a predetermined short interval after having been turned "on."

5. A trigger circuit comprising a first transistor adapted to be switched from the "on" to the "off" state in response to a trigger pulse applied thereto, said first transistor having an output electrode at which a pulse is produced by each such switching operation, impedance means connected to said output electrode for conveying operating potential thereto, a normally "off" switching transistor connected with its emitter-to-collector path shunting said impedance means, means for applying said trigger pulse to said switching transistor to turn it "on," and means connected to said switching transistor for returning it to the "off" state a predetermined short interval after having been turned "on."

6. A trigger circuit comprising a first transistor having an output electrode and an input electrode, means for applying a trigger pulse to said input electrode to switch said first transistor from the "on" to the "off" state, impedance means connected to said output electrode for conveying current thereto, a normally "off" switching transistor connected with its emitter-to-collector path shunting said impedance means, means for applying said trigger pulse to said switching transistor to turn it "on," and means connected to said switching transistor for returning it to the "off" state a predetermined short interval after having been turned "on."

7. A pulse responsive circuit comprising a first transistor having an input electrode and an output electrode, said first transistor being adapted to assume alternate operating states in response to successive trigger pulses applied to said input electrode, an impedance element connected to said output electrode for conveying operating potential thereto, a second transistor connected with its emitter-to-collector path shunting said impedance element, means for biasing said second transistor to remain normally "off," coupling means for conveying each of said trigger pulses to said second transistor to turn it "on," and timing means included in said coupling means for limiting the "on" time of said second transistor to a predetermined short interval.

8. A trigger circuit comprising a pair of transistors each having a control electrode and an output electrode, means for so cross-connecting the control electrode of each of said transistors with the output electrode of the other of said transistors that one of said transistors is "on" when the other is "off," pulse steering means for applying successive trigger pulses to the output electrode of the one of said transistors which is "off," a pair of impedance elements respectively connected to the output electrodes of said transistors for applying operating potentials thereto, a pair of normally open switching means respectively connected across said impedance elements, coupling means for so connecting said switching means to said pulse steering means that each of said trigger pulses is applied to the one of said switching means which is connected across the impedance element of the transistor which is "on," whereby that switching means is caused to close, and timing means included in said coupling means for reopening a closed one of said switching means a predetermined short interval after it has been caused to close.

9. The trigger circuit of claim 8, wherein both of said switching means are switching transistors of which the emitter-to-collector paths are respectively connected across said impedance elements.

10. A trigger circuit comprising a pair of transistors of which each has an input electrode and an output electrode, means for so cross-connecting said input and output electrodes that one of said transistors is normally "on" and the other is normally "off," means for applying a trigger pulse to said normally "on" transistor to cause it to turn "off," impedance means connected to the output electrode of said normally "on" transistor for applying operating potential thereto, normally open switching means connected across said impedance means, coupling means for conveying said trigger pulse to said switching means to cause it to close and thereby effectively short-circuit said impedance means, and timing means included in said coupling means for reopening said switching means a predetermined short interval after it has been caused to close.

11. The trigger circuit of claim 10, wherein said switching means is a switching transistor of which the emitter-to-collector path is connected across said impedance means.

12. A trigger circuit comprising a pair of transistors which each have an "on" state and an "off" state, a pair of impedances respectively connected to said transistors for conveying current thereto, and switching means for momentarily shunting and thereby short-circuiting alternate ones of said impedances in response to successive trigger pulses applied to said trigger circuit, the impedance which is so shunted in response to any trigger pulse being that connected to the one of said transistors which is turned "off" by such pulse.

13. A trigger circuit comprising a pair of transistors which each have an "on" state and an "off" state, a pair of impedances respectively connected to said transistors for conveying current thereto, and switching means for momentarily shunting and thereby effectively short-circuiting one of said impedances in response to each of successive trigger pulses applied to said trigger circuit, the impedance which is so shunted in response to any trigger pulse being that connected to the one of said transistors which is turned "off" by such pulse.

14. A trigger pulse responsive circuit comprising a pair of transistors which each have a first operating state and a second operating state, means for so interconnecting said transistors that when either assumes its first operating state the other assumes its second operating state, a pair of impedances respectively connected to said transistors for conveying current thereto, pulse coupling means connected to said transistors for so applying a trigger pulse thereto that one of them is caused to assume its first operating state, and switching means also connected to said pulse coupling means, said switching means being adapted in response to said trigger pulse to momentarily shunt and thereby effectively short-circuit the one of said impedances which is connected to the one of said transistors which assumes its first operating state in response to that pulse.

15. A trigger circuit comprising a pair of transistors each having a control electrode and an output electrode, means for so cross-connecting the control electrode of each of said transistors with the output electrode of the other of said transistors that one of said transistors is "on" when the other is "off," pulse steering means for applying successive trigger pulses to the output electrode of the one of said transistors which is "off," a pair of impedance elements respectively connected to the output electrodes of said transistors for applying operating potentials thereto, switching means, means for connecting said switching means to said impedance elements, means for further connecting said switching means to said pulse steering means, said switching means being adapted to respond to each of said trigger pulses by short-circuiting the one of said impedance elements which is connected to the output electrode of the one of said transistors which is "on," and timing means connected to said switching means, said timing means being adapted to cause said switching means to terminate the short-circuit across said one impedance element a predetermined short interval after it is established.

16. A trigger circuit comprising a pair of transistors each having an input electrode and an output electrode, means cross-connecting the input electrode of each of said transistors with the output electrode of the other of said transistors so that one of said transistors is turned "on" when the other is turned "off" and vice versa, means for applying a trigger pulse to the output electrode of the one of said transistors which is "off" to cause it to turn "on," a pair of impedance elements respectively connected to the output electrodes of said transistors for applying operating potentials thereto, normally open switching means connected across the impedance element of the transistor being turned "off" in response to the aforementioned application of said trigger pulse, and coupling means for applying said trigger pulse to said switching means to cause the same to close, said switching means serving as an effective short-circuit when closed.

17. A trigger circuit as defined in claim 16 wherein said switching means comprises the emitter-to-collector path of a transistor.

18. A trigger circuit comprising a pair of transistors each having an input electrode and an output electrode, means cross-connecting the input electrode of each of said transistors with the output electrode of the other of said transistors so that one of said transistors is turned "on" when the other is turned "off" and vice versa, means for applying a trigger pulse to the output electrode of the one of said transistors which is "off" to cause it to turn "on," a pair of impedance elements respectively connected to the output electrodes of said transistors for applying operating potentials thereto, normally open transistor switching means in shunt with at least that impedance element associated with the transistor being turned "off" in response to the aforementioned application of said trigger pulse, coupling means for applying said trigger pulse to said switching means to cause the same to close, said switching means serving as an effective short-circuit when so closed, and timing means included in said coupling means for reopening said switching means a predetermined short interval after the closure thereof.

19. A switching circuit comprising a first signal switching means having a first output load; a second signal switching means having a second output load; means for coupling said first and second signal switching means to generate a pulsed output waveform having alternate maximum and minimum semistable conduction periods and respective transition intervals therebetween; a first load switching means substantially bypassing said first output load to provide increased current and rapid response during one of said transition intervals and permitting said first output load to limit the flow of said current during said semistable periods; and a second load switching means for bypassing said second output load during the other of said respective transition intervals and permitting said second output load to limit current during said semistable periods.

20. A pulse switching circuit ocmprising a first signal switching means having an input, an output and a common electrode; a first load connected to said output electrode; a second signal switching means having an input, an output and a common electrode; a second load connected to said second output electrode; means for coupling said output electrode of said first signal switching means to said input electrode of said second signal switching means and for coupling said second signal switching means to said first signal switching means, to generate a pulsed output waveform having alternate maximum and minimum semistable conduction periods and respective transition intervals therebetween; a first load switching means having an input, an output and a common electrode, connected substantially parallel to and bypassing said first load to provide increased current for rapidly charging circuit capacities during one said transition interval, and including means to permit said first load to limit the flow of said current during said semistable output periods; a second load switching means having an input, an output and a common electrode, connected to bypass said second load to provide said increased charging current during the other of said respective transition intervals, and means to permit said second load to limit the flow of said current during said semistable output periods.

21. The device of claim 19 wherein said coupling means includes means to cause each said signal switching means to alternate from one conduction state to another upon application of an extenal trigger pulse and to remain in said other state until the occurrence of a second trigger pulse.

22. The device of claim 21 including bias and direct current supply means to provide potential levels for said external trigger pulse to overcome to initiate action of said signal switching means.

23. A switching circuit comprising a first signal switching means having a first output load; a second signal switching means having a second output load; means for coupling said first and second signal switching means to generate a pulsed output waveform having alternate maximum and minimum conduction periods and respective transition intervals therebetween; a first load switching means substantially bypassing said first output load to provide increased current and rapid response during one of said transition intervals and permitting said first output load to limit the flow of said current during said periods; and a second load switching means for bypassing said second output load during the other of said respective transition intervals and permitting said second output load to limit current during said periods.

24. A pulse switching circuit comprising a first signal switching means having an input, an output and a common electrode; a first load connected to said output electrode; a second signal switching means having an input, an output and a common electrode; a second load connected to said second output electrode; means for coupling said output electrode of said first signal switching means to said input electrode of said second signal switching means and for coupling said second signal switching means to said first signal switching means, to generate a pulsed output waveform having alternate maximum and minimum conduction periods and respective transition intervals therebetween; a first load switching means having an input, an output and a common electrode, connected substantially parallel to and bypassing said first load to provide increased current for rapidly charging circuit capacities during one said transition interval, and including means to permit said first load to limit the flow of said current during said output periods; a second load switching means having an input, an output and a common electrode, connected to bypass said second load to provide said increased charging current during the other of said respective transition intervals, and means to permit said second load to limit the flow of said current during said output periods.

25. The device of claim 23 wherein said coupling means includes means to cause each said signal switching means to alternate from one conduction state to another upon application of an external trigger pulse and to remain in said other state until the occurrence of a second trigger pulse.

26. The device of claim 25 including bias and direct current supply means to provide potential levels for said external trigger pulse to overcome to initiate action of said signal switching means.

References Cited in the file of this patent

UNITED STATES PATENTS

| | | |
|---|---|---|
| 2,594,449 | Kircher | Apr. 29, 1952 |
| 2,831,127 | Braicks | Apr. 15, 1958 |
| 2,838,675 | Wanlass | June 10, 1958 |
| 2,874,315 | Reichert | Feb. 17, 1959 |